(No Model.)

E. S. HOUGH.
PACKING FOR STUFFING BOXES.

No. 328,846. Patented Oct. 20, 1885.

Witnesses.
J. A. Rutherford
Robert Pratt

Inventor:
Edward S. Hough.
By James L. Norris.
Atty.

N. PETERS, Photo-Lithographer, Washington, D. C.

United States Patent Office.

EDWARD STAMFORD HOUGH, OF BROCKLEY, COUNTY OF KENT, ENGLAND.

PACKING FOR STUFFING-BOXES.

SPECIFICATION forming part of Letters Patent No. 328,846, dated October 20, 1885.

Application filed July 22, 1885. Serial No. 172,320. (No model.) Patented in England January 29, 1884, No. 2,345; in France May 30, 1884, No. 162,466, and in Germany May 31, 1884, No. 29,734.

*To all whom it may concern:*

Be it known that I, EDWARD STAMFORD HOUGH, a citizen of England, residing at Brockley, in the county of Kent, England, have invented a new and useful Improved Packing for Stuffing-Boxes, (for which I have obtained a patent in Great Britain, No. 2,345, dated January 29, 1884; in France, No. 162,466, dated May 30, 1884, and in Germany, No. 29,734, dated May 31, 1884,) of which the following is a specification.

As the soft packing used for stuffing-boxes becomes shrunken or worn it is necessary to tighten up frequently the glands which serve to compress the packing, and this it is often very difficult to do properly, especially during the movement of the engines or machines to which the packings belong.

My invention relates to means of avoiding the necessity for frequent adjustment of the packing, and this I effect in the following manner: I divide the packing, which may be of any soft and yielding material usually employed for the purpose, into two separate layers, one to occupy the bottom of the stuffing-box and the other to occupy the top next to the boss of the gland. Between these two layers of packing I insert a pair of metallic washers—one next each layer—and between the washers springs, compressed so as to exert a force pushing the washers apart and so causing them to keep the two layers of packing in a state of compression. A single spring may be used, this being made in helical or zigzag form, surrounding the rod or plunger which works through the stuffing-box; or, when the rod or plunger is of considerable size, a number of springs may be arranged within the annular space of the stuffing-box. The washers may have their faces that bear on the layers of packing sloped, so as to tend to press the ring of packing inward, and in cases where entire washers cannot conveniently be passed onto the rod or plunger they may be made in halves, and in that case each is preferably made in two thicknesses, breaking joint.

Figure 1:
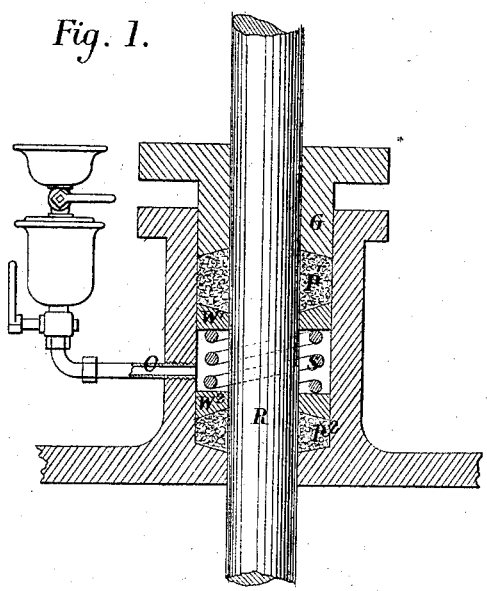

Figure 1 of the accompanying drawings represents the section of a stuffing-box with packing according to my invention, with its two layers of packing P' and P² and washers W' W², between which is a helical spring, S, surrounding the piston-rod R. The gland G is tightened down in the usual way by bolts and nuts, compressing the packings and the spring, and the elasticity of the spring maintains the pressure on the packings when they become shrunken or worn.

O is an oil-pipe, to introduce lubricant into the stuffing-box.

Figure 2:
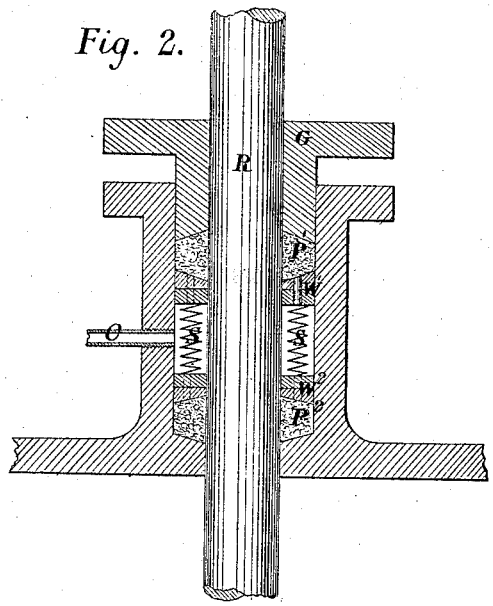

In Fig. 2, which represents the section of a stuffing-box with packing according to my invention for a rod, R, which may be a plunger of considerable diameter, separate springs S are arranged around the rod R, and the washers W' W² are shown made in two thicknesses, so that each thickness can be put on the rod in halves, the two thicknesses being then in each case turned so far round as to break joint of their halves, and so retained by the steady pins or dowels.

Having thus described the nature of my invention and the best means I know for carrying the same into practical effect, I claim—

1. In a stuffing-box, the combination, with a gland entering one end of said box and having a concave surface, of a washer, W', surrounding the piston-rod and having a concave surface opposite the gland, a second washer, W², having a concave surface opposite the concave end of the stuffing-box, packing P' P², interposed between each pair of concave surfaces, and a helical spring placed between the washers for pressing the same constantly upon the packing W' W², substantially as described.

2. In a stuffing-box, the combination, with a gland entering one end of said box and having a concave surface, of a washer, W', surrounding the piston-rod and having a concave surface opposite the gland, a second washer, W², having a concave surface opposite the concave end of the stuffing-box, packing P' P², interposed between each pair of concave surfaces, and a helical spring placed between the washers for pressing the same constantly upon the packing W' W², with an oil-cup supported by the stuffing-box and communicating with the interior of the box through the chamber occupied by the spring, as set forth.

In testimony whereof I have signed my name to this specification, in the presence of two subscribing witnesses, this 9th day of July, A. D. 1885.

EDWARD STAMFORD HOUGH.

Witnesses:
JNO. P. M. MILLARD,
G. H. HADDEN.